US010260354B2

(12) United States Patent
Bunker

(10) Patent No.: US 10,260,354 B2
(45) Date of Patent: Apr. 16, 2019

(54) AIRFOIL TRAILING EDGE COOLING

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 15/042,611

(22) Filed: Feb. 12, 2016

(65) Prior Publication Data
US 2017/0234138 A1    Aug. 17, 2017

(51) Int. Cl.
F01D 5/18    (2006.01)
B33Y 10/00    (2015.01)
(Continued)

(52) U.S. Cl.
CPC ............ F01D 5/187 (2013.01); B22D 25/02 (2013.01); B22F 3/1055 (2013.01); B22F 5/04 (2013.01);
(Continued)

(58) Field of Classification Search
CPC .......... F01D 5/147; F01D 5/186; F01D 5/187; F01D 9/041; F01D 25/21; B33Y 10/00;
(Continued)

(56) References Cited

U.S. PATENT DOCUMENTS 6,468,669 B1 * 10/2002 Hasz .................... C23C 24/10
428/553
9,107,026 B1    8/2015 Viswanadham et al.
(Continued)

FOREIGN PATENT DOCUMENTS

DE    102015107841 A1    12/2015
EP    2685170 A1    1/2014
(Continued)

OTHER PUBLICATIONS

Extended European Search Report and Opinion issued in connection with corresponding EP Application No. 17155173.2 dated Jul. 3, 2017.
Machine translation of Japanese Office Action issued in connection with corresponding JP Application No. 2017012600 dated Jan. 9, 2018.
(Continued)

Primary Examiner — Matthew W Jellett
(74) Attorney, Agent, or Firm — General Electric Company; William Andes

(57) ABSTRACT

A turbine airfoil for a gas turbine engine includes a pressure sidewall extending along a spanwise direction, and from a leading edge of the airfoil towards the trailing edge of the airfoil. The turbine airfoil additionally includes a suction sidewall also extending along the spanwise direction, and from the leading edge towards the trailing edge. The pressure sidewall and suction sidewall define a cooling air cavity therebetween, and one or both of the pressure sidewall and suction sidewall define a trailing edge cooling channel extending from the cooling air cavity substantially to the trailing edge. Additionally, one or both of the pressure sidewall and suction sidewall include a plurality of pressure drop members extending partially into the trailing edge cooling channel for reducing an amount of cooling air flowing therethrough from the cooling air cavity.

19 Claims, 7 Drawing Sheets

(51) Int. Cl.
  *B33Y 80/00* (2015.01)
  *B22D 25/02* (2006.01)
  *B22F 3/105* (2006.01)
  *B22F 5/04* (2006.01)
  *B23K 20/02* (2006.01)
  *F01D 5/14* (2006.01)
  *F01D 9/04* (2006.01)
  *F01D 25/12* (2006.01)
  *B23K 101/00* (2006.01)

(52) U.S. Cl.
  CPC .............. *B23K 20/02* (2013.01); *B33Y 10/00* (2014.12); *B33Y 80/00* (2014.12); *F01D 5/147* (2013.01); *F01D 5/186* (2013.01); *F01D 9/041* (2013.01); *F01D 25/12* (2013.01); *B23K 2201/001* (2013.01); *F05D 2220/32* (2013.01); *F05D 2230/21* (2013.01); *F05D 2230/22* (2013.01); *F05D 2230/236* (2013.01); *F05D 2230/237* (2013.01); *F05D 2230/31* (2013.01); *F05D 2240/122* (2013.01); *F05D 2240/128* (2013.01); *F05D 2240/304* (2013.01); *F05D 2240/40* (2013.01); *F05D 2250/241* (2013.01); *F05D 2260/202* (2013.01); *F05D 2260/2214* (2013.01); *F05D 2300/10* (2013.01)

(58) Field of Classification Search
  CPC .......... B33Y 80/00; B22F 3/1055; B22F 5/04; B23K 20/02
  See application file for complete search history.

(56) References Cited

U.S. PATENT DOCUMENTS

| | | |
|---|---|---|
| 9,145,773 B2 | 9/2015 | Bergholz, Jr. et al. |
| 9,175,569 B2 | 11/2015 | Bergholz, Jr. et al. |
| 2003/0133795 A1 | 7/2003 | Manning et al. |
| 2008/0124225 A1 | 5/2008 | Baldauf et al. |
| 2008/0286115 A1 | 11/2008 | Liang |
| 2010/0074763 A1 | 3/2010 | Liang |
| 2013/0302176 A1 | 11/2013 | Bergholz, Jr. et al. |
| 2013/0302177 A1 | 11/2013 | Bergholz, Jr. et al. |
| 2014/0068058 A1 | 3/2014 | Wolf |
| 2014/0216042 A1 | 8/2014 | Hanson |
| 2015/0096305 A1 | 4/2015 | Morgan et al. |
| 2015/0147158 A1 | 5/2015 | Wang et al. |
| 2015/0345303 A1 | 12/2015 | Dong et al. |
| 2016/0008889 A1 | 1/2016 | Xu |

FOREIGN PATENT DOCUMENTS

| | | |
|---|---|---|
| EP | 2 787 173 A1 | 10/2014 |
| EP | 3 093 438 A1 | 11/2016 |
| JP | 2003520134 A | 7/2003 |
| WO | 0051761 A1 | 9/2000 |
| WO | 2014/165337 A1 | 10/2014 |
| WO | 2015/073092 A2 | 5/2015 |

OTHER PUBLICATIONS

Unofficial English translation of Office Action issued in connection with corresponding CN Application No. 201710075032.1 dated Jun. 21, 2018.

* cited by examiner

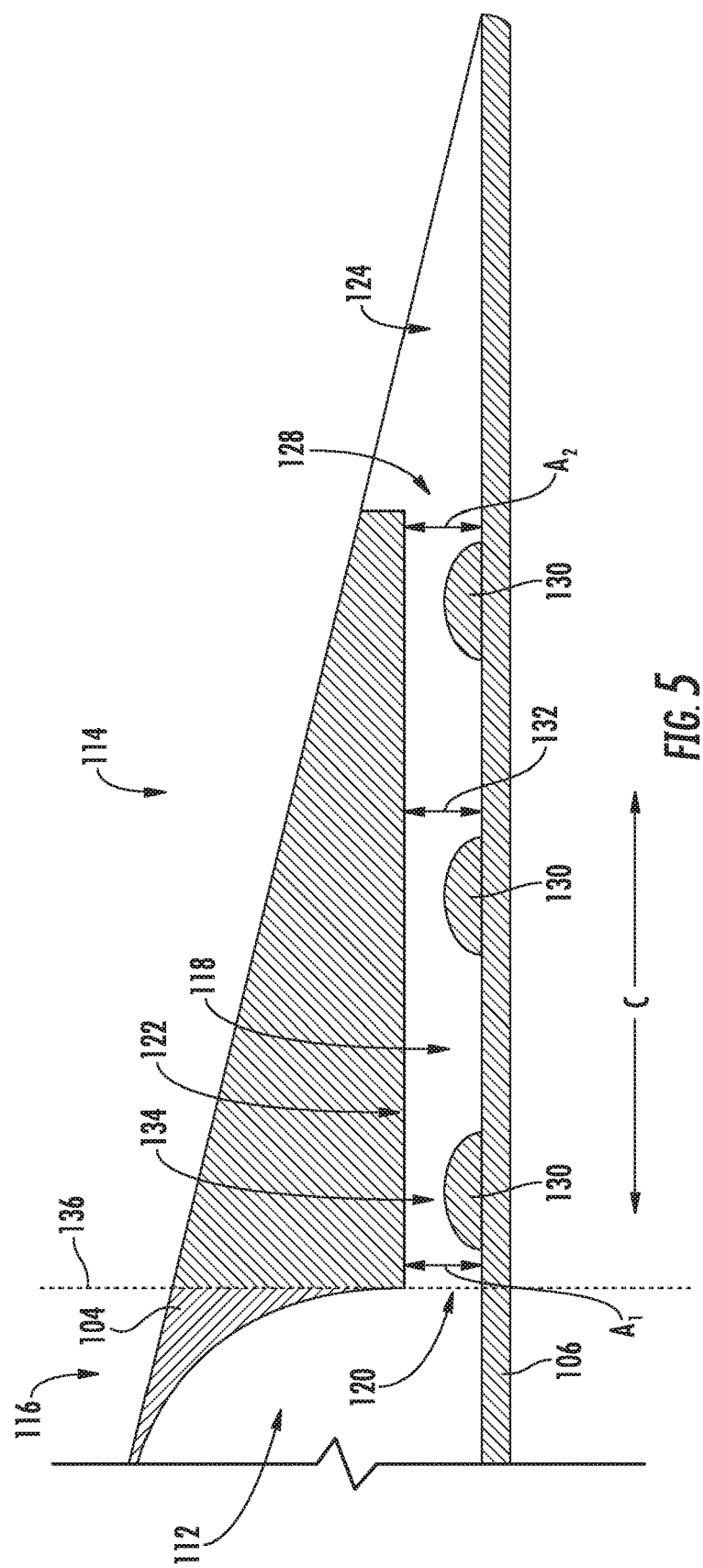

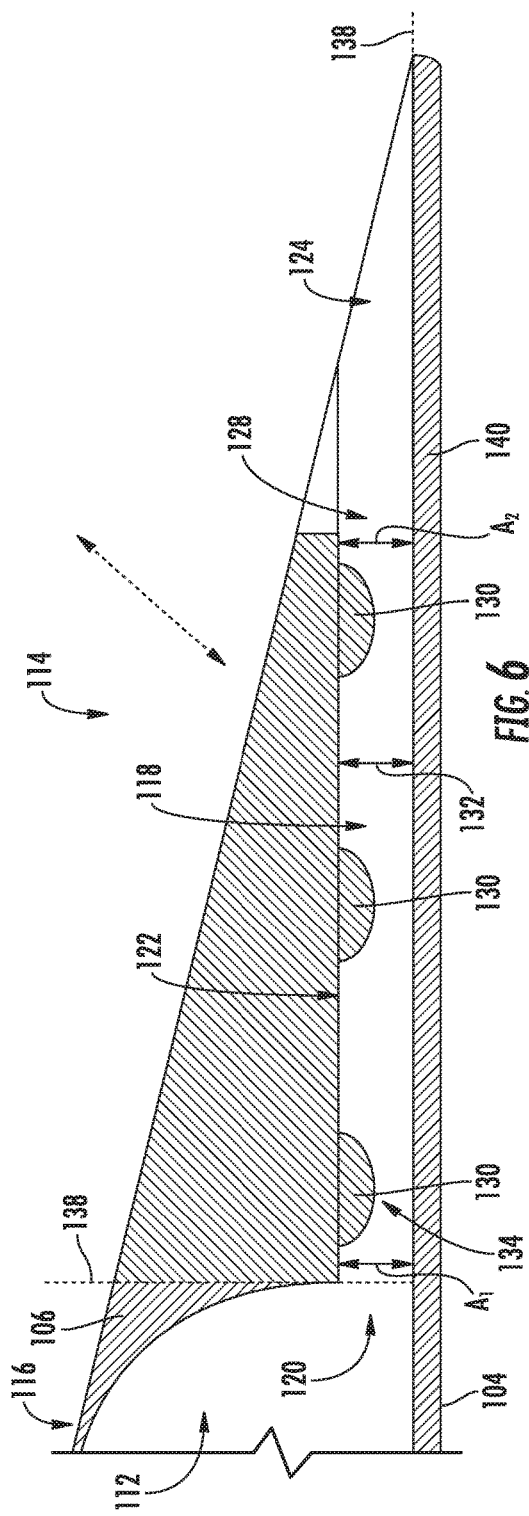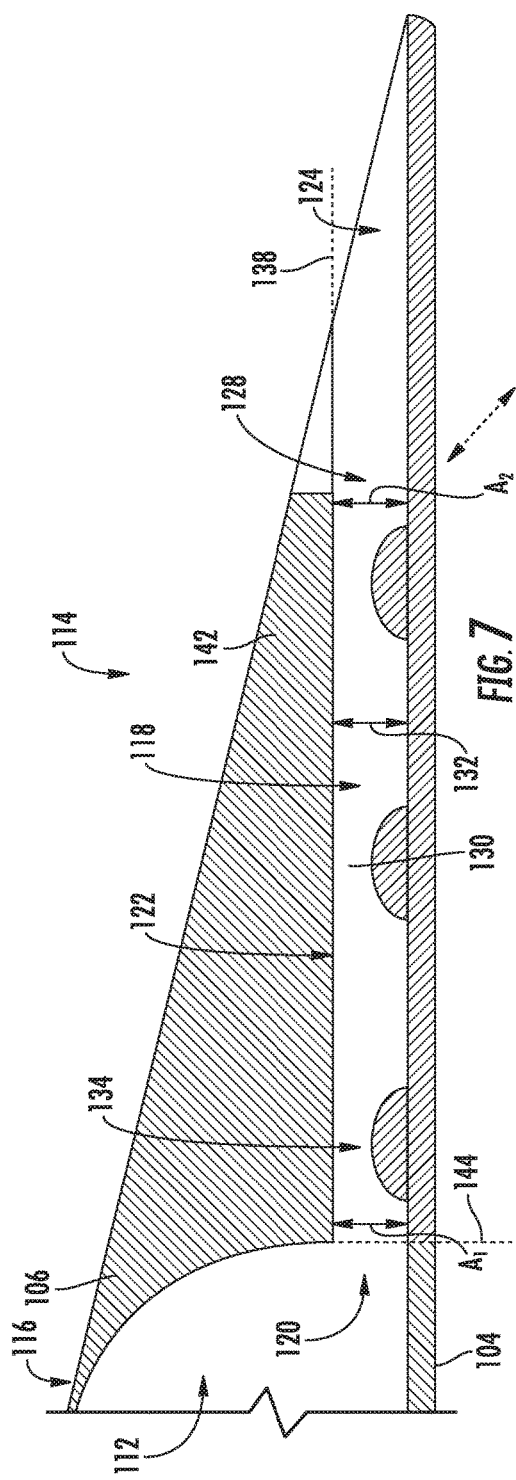

AIRFOIL TRAILING EDGE COOLING

FIELD OF THE INVENTION

The present subject matter relates generally to a cooling channel within an airfoil of a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

The turbine section typically includes a plurality of sequentially arranged stage(s) of turbine nozzles and turbine rotor blades. Each of the turbine nozzles within the various stages of turbine nozzles and each of the turbine rotor blades within the various stages of turbine rotor blades include an airfoil. These airfoils are typically actively cooled by flowing cool air into a central cavity of the airfoil and through a variety of cooling holes arranged in various locations on the airfoil. For example, an airfoil may include a variety of cooling holes at a leading edge, a variety of cooling holes along a pressure side and a suction side, and a variety of cooling holes at a trailing edge.

Given the nature of the airfoil, cooling air within the central cavity of the airfoil generally experiences the greatest pressure drop through the cooling holes at the trailing edge of the airfoil. For example, the trailing edge is desired to be as thin as possible in order to minimize aerodynamic losses. Accordingly, a section forming the trailing edge may also be relatively long, making it difficult to cast or machine small cooling holes through the length. Such a configuration may result in larger than desirable cooling holes allowing more cooling fluid flow than required or desired.

Accordingly, an airfoil having a trailing edge cooling channel with additional means for controlling an amount of airflow therethrough would be useful. More particularly, an airfoil having a trailing edge cooling channel including a metering section along with additional means for controlling an amount of airflow therethrough would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a turbine airfoil for a gas turbine engine is provided. The turbine airfoil defines a spanwise direction, a leading edge, and a trailing edge. The turbine airfoil includes a pressure sidewall extending along the spanwise direction and from the leading edge towards the trailing edge. The turbine airfoil also includes a suction sidewall extending along the spanwise direction and from the leading edge towards the trailing edge. The pressure sidewall and the suction sidewall define a cooling air cavity therebetween. One or both of the pressure sidewall and suction sidewall define a trailing edge cooling channel extending from the cooling air cavity substantially to the trailing edge. One or both of the pressure sidewall and suction sidewall include a plurality of pressure drop members extending partially into the trailing edge cooling channel for reducing an amount of cooling air flowing therethrough from the cooling air cavity.

In another exemplary aspect of the present disclosure, a method of manufacturing a gas turbine engine turbine airfoil defining a leading edge and a trailing edge is provided. The method includes forming a body section of the airfoil extending from the leading edge of the airfoil towards the trailing edge of the airfoil. The body section defines a cooling air cavity located proximate the trailing edge. The method also includes forming a trailing edge section of the airfoil using an additive manufacturing process. The trailing edge section is formed integrally with or attachable to the body section of the airfoil. The trailing edge section at least partially defines a trailing edge cooling channel extending from the cooling air cavity defined by the body section substantially to the trailing edge of the airfoil. The trailing edge section including a plurality of pressure drop members extending partially into the trailing edge cooling channel for reducing an amount of cooling air flowing therethrough.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 is a close-up, side, cross-sectional view of a trailing edge cooling channel of the rotor blade of the exemplary rotor blade section of FIG. 3.

FIG. 6 is a close-up, side, cross-sectional view of a trailing edge cooling channel of a rotor blade in accordance with another exemplary embodiment of the present disclosure.

FIG. 7 is a close-up, side, cross-sectional view of a trailing edge cooling channel of a rotor blade in accordance with yet another exemplary embodiment of the present disclosure.

DETAILED DESCRIPTION OF THE INVENTION

Figure 1:
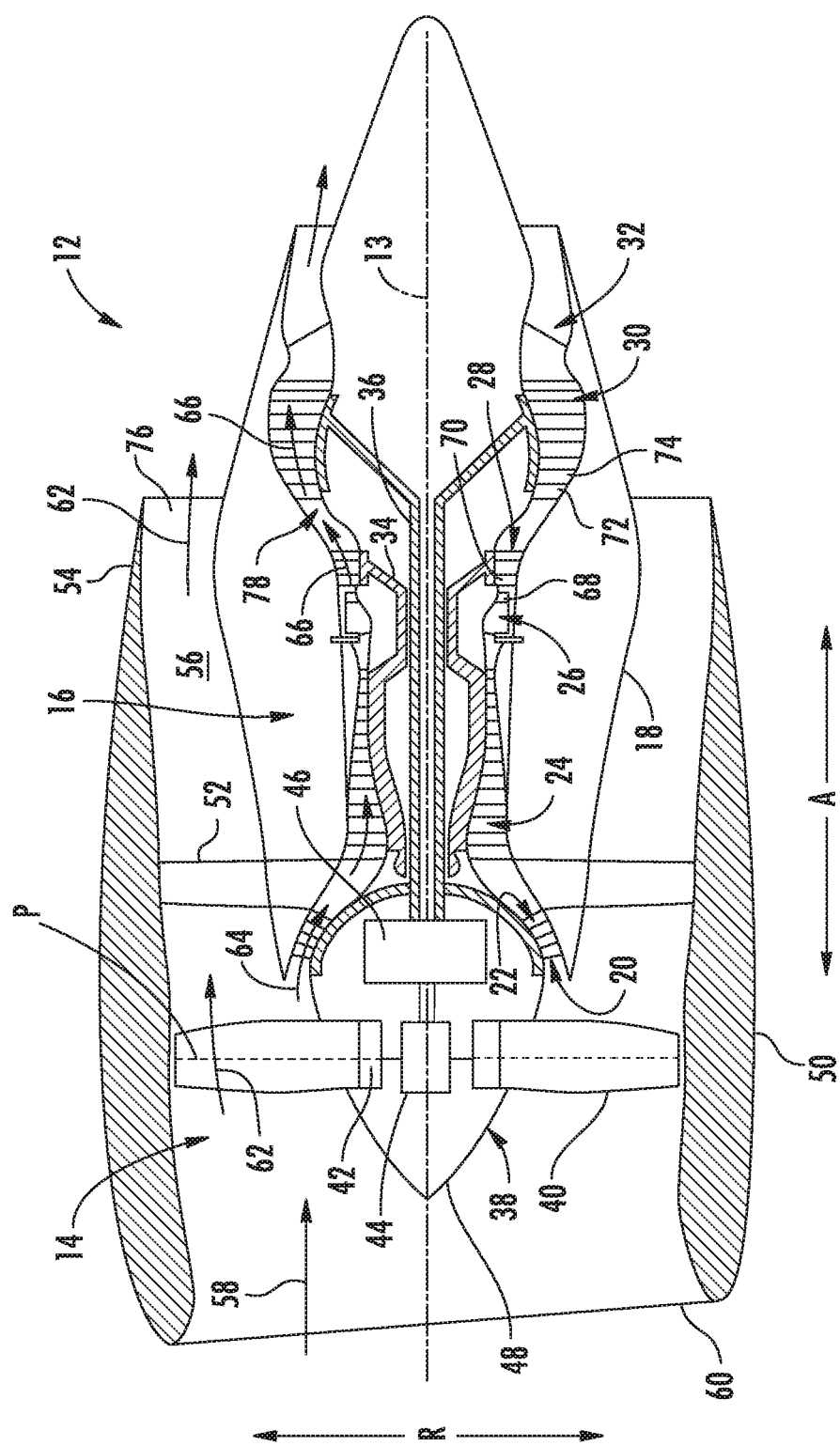
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A (extending parallel to a longitudinal centerline 13 provided for reference), a radial direction R, and a circumferential direction (not shown) extending about the axial direction A. In general, the turbofan 12 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 12.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 12 depicted in FIG. 1 is provided by way of example only, and that in other exemplary embodiments, the turbofan engine 12 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
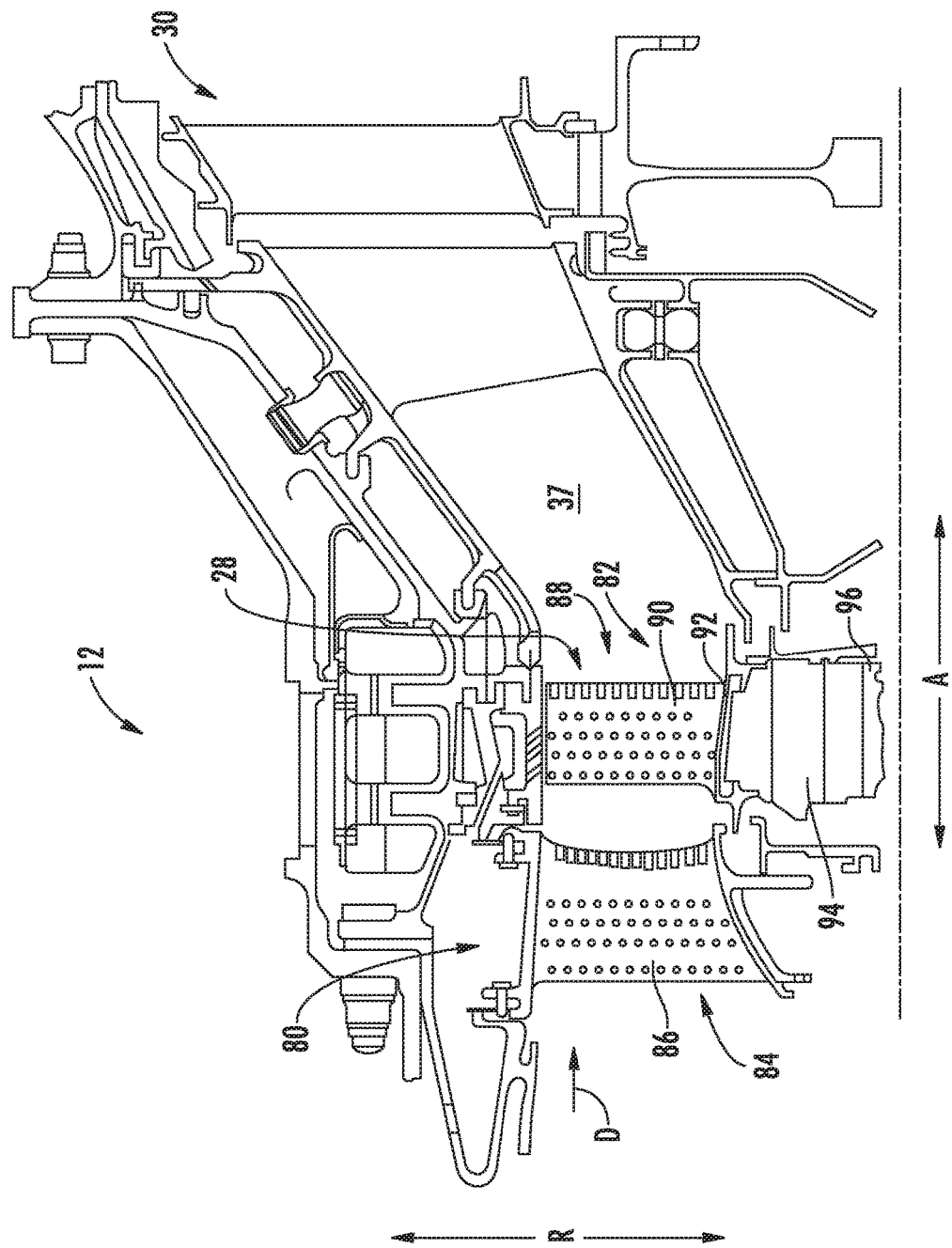
FIG. 2 is a close-up, side view of a turbine section of the exemplary gas turbine engine of FIG. 1.

Referring now to FIG. 2, a close-up view of the exemplary turbofan engine 12 of FIG. 1 is provided. More particularly, FIG. 2 provides a close-up view of the turbine section, including the HP turbine 28 and a first rotor blade stage of the LP turbine 30. The HP turbine 28 is positioned downstream of a combustor (not shown) of the combustion section 26 and upstream of the LP turbine 30. As discussed above, the combustion section 26, or rather the combustor, mixes fuel with pressurized air for generating hot combustion gases which flows in a downstream direction D through the turbines.

The HP turbine 28 includes a first turbine nozzle stage 80 located upstream of a first rotor blades stage 82. The first turbine nozzle stage 80 includes a plurality of circumferentially spaced nozzles sections 84. Each of the nozzle sections 84 includes an airfoil 86 configured for directing an airflow through the HP turbine 28. Similarly, the first rotor blade stage 82 includes a plurality of circumferentially spaced HP turbine rotor blades 88. Each of the HP turbine rotor blades 88 includes a turbine airfoil 90 integrally formed with a platform 92 and an axial entry dovetail 94, which is used to mount the HP turbine rotor blade 88 on a perimeter of a supporting rotor disk 96.

Figure 3:
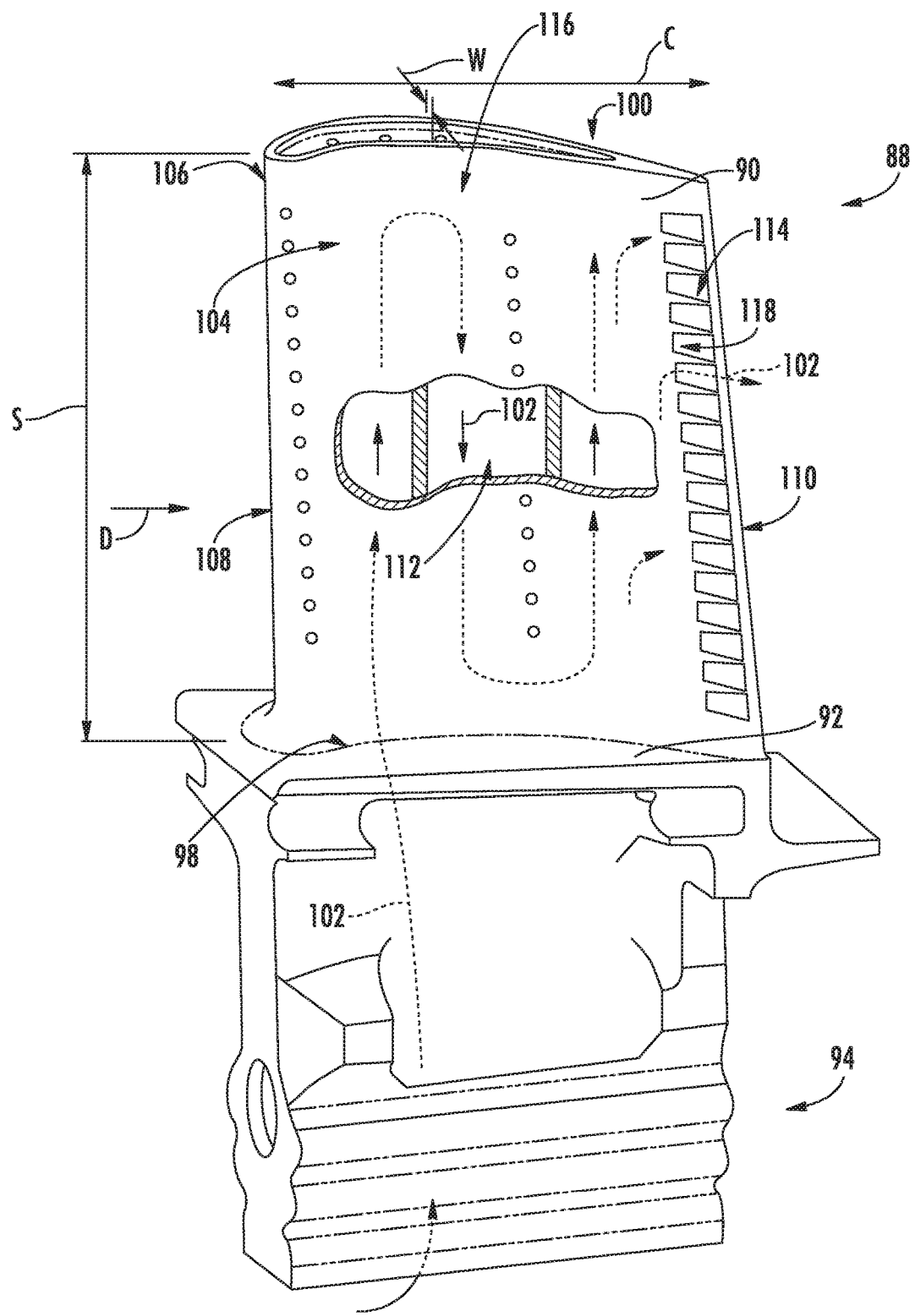
FIG. 3 is a perspective view of a rotor blade section in accordance with an exemplary embodiment of the present disclosure, the rotor blade section configured for a rotor blades stage of the turbine section of the exemplary gas turbine engine of FIG. 1.

Referring now to FIG. 3, providing a perspective view of a HP turbine rotor blade 88, the airfoil 90 extends outwardly along a spanwise direction S (and along a radial direction R when installed in a gas turbine engine) from an airfoil base 98 on the blade platform 92 to an airfoil tip 100. During operation, hot combustion gases are generated in the combustor and flow downstream D over the turbine airfoil 90 which extracts energy therefrom for rotating the rotor disk 96 supporting the HP turbine rotor blade 88. The rotor disk 96 may, in turn, rotate a shaft or spool (e.g., HP shaft 34, not shown) for powering, e.g., a compressor. A portion of pressurized air 102, e.g., from the compressor section of the turbofan engine 12, may be directed to the HP turbine rotor blade 88 for cooling thereof during operation.

The airfoil 90 includes widthwise spaced apart generally concave pressure sidewall 104 and convex suction sidewall 106. The pressure and suction sidewalls 104, 106 extend outwardly along the spanwise direction S from the airfoil base 98 to the airfoil tip 100. The sidewalls 104, 106 also extend generally along a chordwise direction C (and along an axial direction A when installed in a gas turbine engine) from a leading edge 108 towards an opposing trailing edge 110. The exemplary airfoil 90 depicted is hollow with the pressure and suction sidewalls 104, 106 being spaced widthwise or laterally apart between the leading and trailing edges 108, 110 to define an internal cooling air cavity 112 or circuit therein. The cooling air cavity 112 may circulate the pressurized cooling air 102, e.g., from the compressor section, and inject such cooling air 102 onto a hot side surface of the airfoil 90 as film cooling during operation.

The exemplary turbine airfoil 90 depicted increases in width W or widthwise from the leading edge 108 to a maximum width aft therefrom and then converges to a relatively thin or sharp trailing edge 110. The size of the internal cooling air cavity 112 therefore varies with the width W of the airfoil 90, and is relatively thin immediately forward of the trailing edge 110 where, for the embodiment depicted, the two sidewalls 104, 106 integrally join together and form a thin trailing edge section 114 of the airfoil 90 (located aft or downstream D from a body section 116 of the airfoil 90, the body section 116 defined by both the pressure sidewall 104 and suction sidewall 106). One or both of the pressure sidewall 104 and suction sidewall 106 additionally define a trailing edge cooling channel 118 extending from the cooling air cavity 112 substantially to the trailing edge 110. More particularly, for the embodiment depicted, one or both of the pressure sidewall 104 and suction sidewall 106 define a plurality of trailing edge cooling channels 118, the plurality of trailing edge cooling channel 118 spaced along the spanwise direction S of the airfoil 90. Each of the plurality of trailing edge cooling channels 118 is configured to cool the trailing edge 110 of the airfoil 90.

Figure 4:
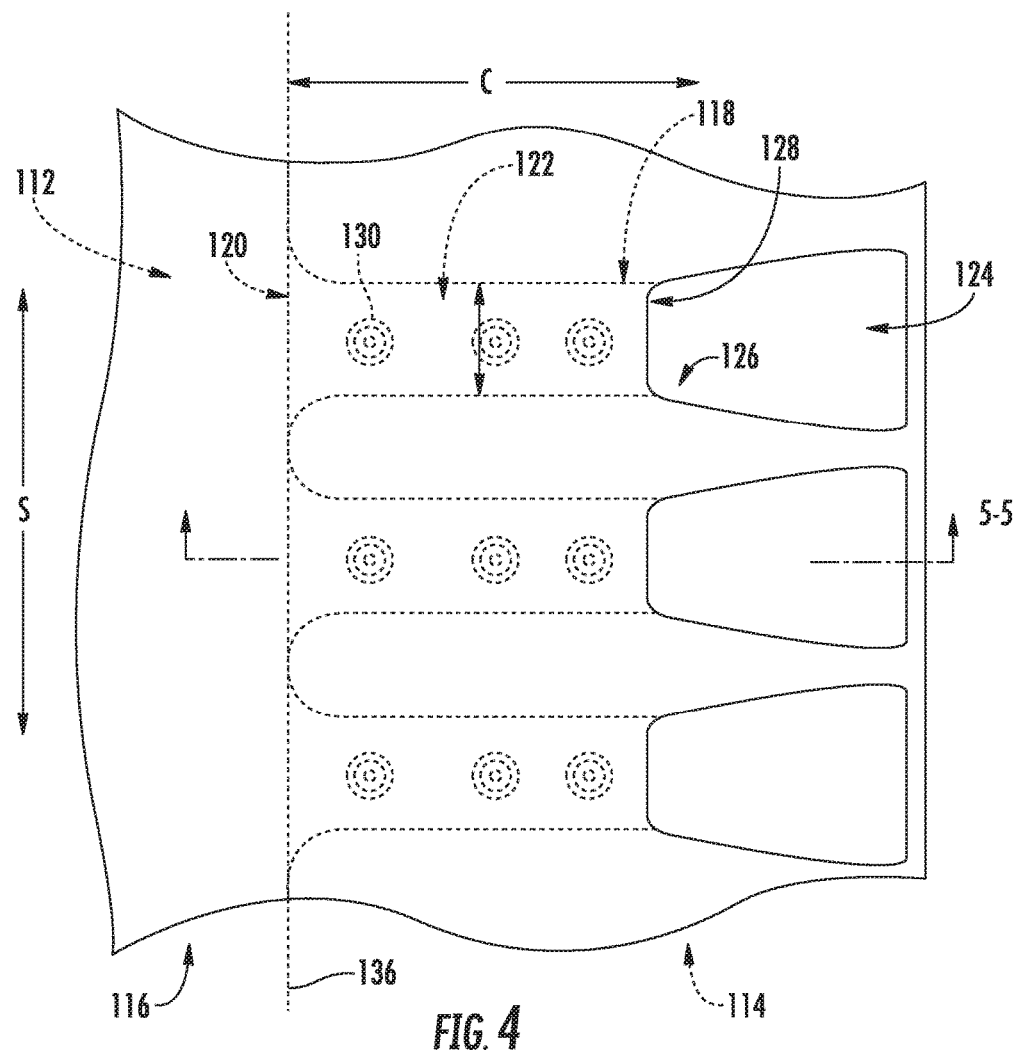
FIG. 4 is a close-up view of a trailing edge of a rotor blade of the exemplary rotor blade section of FIG. 3.

Referring now also to FIGS. 4 and 5, close-up views of one or more trailing edge cooling channels 118 are provided. Specifically, FIG. 4 provides a close-up view of three of the plurality of spanwise spaced apart trailing edge cooling channels 118; and FIG. 5 provides a close-up, side, cross-sectional view of one of the plurality of trailing edge cooling channels 118, taken along Line 5-5 of FIG. 4. As is depicted, the trailing edge cooling channels 118 each extend along the chordwise direction C substantially to the trailing edge 110. Additionally, the trailing edge cooling channels 118 are spaced along the spanwise direction S and are in flow communication with the cooling air cavity 112 for discharging the cooling air 102 therefrom during operation.

Each trailing edge cooling channel 118 includes in serial flow relationship, an inlet 120, an interior portion 122, and a trailing edge cooling slot 124. With such an embodiment, cooling air 102 may flow through the interior portion 122 of the trailing edge cooling channel 118 to the trailing edge cooling slot 124. The trailing edge cooling slot 124, sometimes referred to as the pressure side bleed slot, begins at a breakout 126 at a downstream end 128 of the interior portion 122 and, for the embodiment illustrated, diverges spanwise. Such a configuration may allow for a flow of cooling air 102 through the plurality of trailing edge cooling channels 118 to disperse and more effectively cool the trailing edge 110 of the airfoil 90 in the spanwise direction S. It should be appreciated, however, that in other embodiments, the cooling channels 118 may not include the trailing edge cooling slot 124, and instead the cooling channels 118 may extend directly to the trailing edge 110. With such an embodiment, the trailing edge cooling channel 118 may instead be referred to a trailing edge ejection hole. Additionally, although for the embodiment depicted the trailing edge cooling channels 118 each extend generally along the chordwise direction C, in other embodiments, the cooling channels 118 may instead have any other suitable orientation, and may define an angle relative to the chordwise direction C.

Further, for the embodiment depicted, one or both of the pressure sidewall 104 and suction sidewall 106 include a plurality of pressure drop members 130 extending partially into each of the trailing edge cooling channels 118 for reducing an amount of cooling air 102 flowing therethrough from the cooling air cavity 112. More specifically, for the embodiment depicted, the suction sidewall 106 includes the plurality of pressure drop members 130 extending partially into each of the trailing edge cooling channels 118 (see FIG. 5). Each of these pressure drop members 130 are configured as a semi-circular, rounded protrusion extending partially into the trailing edge cooling channel 118. The semi-circular protrusions may each be substantially the same size. It should be appreciated, however, that although each of the plurality of pressure drop members 130 have a substantially consistent size and shape for the embodiment depicted, in other exemplary embodiments, a size and/or shape of the pressure drop members 130 may vary in any suitable manner. It should also be appreciated that as used herein, "extending partially into" refers to the pressure drop member 130 extending from one wall, into the cooling channel 118, but not across the cooling channel 118. For example, in the embodiment depicted, the pressure drop members 130 extend from suction sidewall 106 into the cooling channel 118, but do not connect to the pressure sidewall 104.

Referring now particularly to FIG. 5, the interior portion 122 of each of the cooling holes 30 includes height 132 defined between the pressure sidewall 104 and suction sidewall 106. As is depicted, the height 132 of each of the trailing edge cooling channels 118 is substantially constant for the interior portions 122 of the respective channels 118. Moreover, with the exception of the plurality of pressure drop members 130 extending partially into the trailing edge cooling channels 118, the interior portions 122 of the trailing edge cooling channels 118 define a substantially constant cross-sectional flow area (i.e., an area defined in a plane perpendicular to a centerline of the respective cooling channels 118). For example, the exemplary trailing edge cooling channel 118 depicted defines a first cross-sectional flow area A1 immediately upstream of the plurality of pressure drop members 130, e.g., proximate the inlet 120 of the trailing edge cooling channel 118. The trailing edge cooling channel 118 additionally defines a second cross-sectional flow area A2 immediately downstream of the plurality of pressure drop members 130, and immediately upstream of the trailing edge cooling slot 124. For the embodiment depicted, the first cross sectional flow area A1 is substantially the same as the second cross sectional flow area A2. Additionally, although not marked in the FIGS., the interior portion 122 of the trailing edge cooling channel 118 defines a variety of intermediate cross-sectional flow areas between adjacent pressure drop members 130. Each of these intermediate cross-sectional flow areas is substantially the same as the first and second cross-sectional flow areas A1, A2. It should be appreciated, that as used herein, terms of approximation, such as "about" or "substantially," refer to being within a 5% margin of error.

Within the interior portions 122 of the trailing edge cooling channels 118, the trailing edge cooling channel 118 defines a primary metering section 134. The primary metering section 134 refers to a minimum cross-sectional flow area for a given trailing edge cooling channel 118. For the embodiment depicted, one of the plurality of pressure drop members 130 is located at the primary metering section 134, and at least partially defines the primary metering section 134. Notably, for the embodiment depicted, each of the plurality of pressure drop members 130 within the interior portion 122 of the trailing edge cooling channels 118 are substantially the same size, and the interior portion 122 of the trailing edge cooling channel 118 defines a substantially constant cross-sectional flow area (save for the pressure drop members 130). The pressure drop member 130 located proximate the inlet 120 (i.e., an upstream pressure drop member) is located at, and at least partially defines, the primary metering section 134.

Although the exemplary trailing edge cooling channel 118 may define substantially the same cross-sectional area at each of the plurality of pressure drop members 130, the downstream pressure drop members 130 are not be considered the primary metering section (as there is no reduction in cross-sectional area). However, the downstream pressure drop members 130 may still assist in controlling a flow of cooling airflow therethrough by effecting a pressure drop of the cooling air 102 flowing therethrough. Accordingly, such a configuration may further reduce a flowrate of the cooling air 102 flowing therethrough without requiring additional reductions to the cross-sectional area of the primary metering section 134. More particularly, by including the one or more pressure drop members 130 downstream of, and in addition to, the primary metering section 134, the primary metering section 134 may include a larger opening that may be easier to manufacture accurately.

It should be appreciated, however, that in other exemplary embodiments, the trailing edge cooling channels 118 may have any suitable configuration. For example, although for the embodiments depicted, the interior portions 122 of the trailing edge cooling channels 118 each define a substantially consistent height 132 (and cross-sectional area), in other exemplary embodiments the interior portions 122 of the trailing edge cooling channels 118 may vary in height 132, and may, e.g., diverge or converge, along a length thereof. Further, in other exemplary embodiments, the trailing edge cooling channels 118 may define any suitable cross-sectional shape. For example, in the embodiments depicted, the trailing edge cooling channels may define a circular cross-sectional shape, or alternatively may define a squared or rectangular cross-sectional shape, or any other suitable cross-sectional shape.

It should also be appreciated that the pressure drop members 130 may in other exemplary embodiments vary in size, shape, and/or number. For example, in other embodiments, one or more of the pressure drop members 130 may not have a rounded, semicircular shape, and each trailing edge cooling channel may only include two pressure drop members, or alternatively may include four or more pressure drop members. In one or more of the above embodiments, the primary metering section 134 in the trailing edge cooling channel 118 may not be defined at the upstream pressure drop member 130, and instead may be defined at one of the intermediate or downstream pressure drop members 130. Furthermore, in certain embodiments, the plurality of pressure drop members 130 may be sized such that a local effective cross-sectional area at the respective pressure drop members 130 allow two or more pressure drop members 130 to act equally as metering sections. For example, two separate pressure drop members 130 may each provide about half of an overall pressure loss through the trailing edge cooling channel 118. By providing two or more pressure drop members 130 configured to effect a pressure drop, the metering function is distributed to more than a single cross sectional area, and hence may be more manufacturable (e.g., may allow for less restrictive size limitations) and may also be more robust to variations Referring still to FIG. 5, as previously noted, the pressure sidewall 104 and suction sidewall 106 together define a body section 116 of the airfoil 90. Additionally, for the embodiment depicted, both of the pressure sidewall 104 and suction sidewall 106 together define the trailing edge section 114 of the airfoil 90. The trailing edge section 114 is formed separately from the body section 116. The separately formed trailing edge section 114 may be attached to the body section 116, for the embodiment depicted at the attachment line 136 (see also FIG. 4). For example, in certain exemplary embodiments, the body section 116 of the airfoil 90 may be formed at least partially by casting the body section 116 of the airfoil 90, and the trailing edge section 114 of the airfoil 90 may be formed using an additive manufacturing process (also known as rapid prototyping, rapid manufacturing, and 3D printing). For example, in certain exemplary aspects, the trailing edge section 114 of the airfoil 90 may be manufactured using selective laser sintering (SLS), direct metal laser sintering (DMLS), electron beam melting (EBM), diffusion bonding, or selective heat sintering (SHS). Such an exemplary manufacturing process may allow for an airfoil 90 including the relatively fine details described in the exemplary trailing edge section 114 of the airfoil 90. Alternatively, however, the trailing edge section 114 may be constructed (e.g., printed) directly onto the existing projection 140.

It should be appreciated, however, that in other exemplary embodiments, the trailing edge section 114 may instead be manufactured in any other suitable manner. For example, referring now to FIG. 6, a close-up, side, cross-sectional view of a trailing edge cooling channel 118 of a trailing edge section 114 in accordance with another exemplary embodiment of the present disclosure is provided. The airfoil 90 of the exemplary embodiment of FIG. 6 may be configured in substantially the same manner as exemplary airfoil 90 depicted in FIG. 5. Accordingly, the same or similar numbering may refer to the same or similar part.

As is depicted, however, a pressure sidewall 104 and a suction sidewall 106 of the exemplary airfoil 90 of FIG. 6 do not together define a trailing edge section 114 of the exemplary airfoil 90. Instead, as is indicated by an attachment line 138, the pressure sidewall 104 defines the separately formed trailing edge section 114 of the airfoil 90. With such an exemplary embodiment, the suction sidewall 106 includes a projection 140 extending along the spanwise direction S and extending along the chordwise direction C to which the trailing edge section 114 (defined by a portion of the pressure sidewall 104) may be attached. The separately formed portion of the pressure sidewall 104 defining the trailing edge section 114 may be formed using an additive manufacturing process, and may include a plurality of pressure drop members 130 extending partially into the trailing edge cooling channel 118 once the trailing edge section 114 is attached to the body section 116 of the airfoil 90. Notably, for the embodiment depicted, the trailing edge cooling channels 118 are together defined by the pressure sidewall 104 and the suction sidewall 106 (or rather the projection 140 of the suction sidewall 106).

For the embodiment depicted, the separately formed trailing edge section 114 may be attached after constructing (e.g., "printing") the trailing edge section. Alternatively, however, the trailing edge section 114 may be constructed (e.g., printed) directly onto the existing projection 140. Regardless, it should be appreciated that the projection 140 of the suction sidewall 106 may be cast with the suction sidewall 106 and machined to a desired final definition (e.g., final desired thickness, etc.), and/or may undergo some other machining steps to, e.g., prepare a surface of the projection for joining or printing thereon.

Further, however, in still other exemplary embodiments, the trailing edge section 114 may be manufactured in any other suitable manner. For example, referring now to FIG. 7, a close-up, side, cross-sectional view of the trailing edge cooling channel 118 of a trailing edge section 114 in accordance with another exemplary embodiment of the present disclosure is provided. The airfoil 90 of the exemplary embodiment of FIG. 7 may also be configured in substantially the same manner as the exemplary airfoil 90 depicted in FIG. 5. Accordingly, the same or similar numbering may refer to the same or similar part.

For the exemplary airfoil 90 of FIG. 7, the suction sidewall 106 defines the separately formed trailing edge section 114 of the airfoil 90 (as is indicated by the attachment line 144. With such an exemplary embodiment, the pressure sidewall 104 includes a projection 142 extending along the spanwise direction S and along the chordwise direction C to which the trailing edge section 114 (defined by a portion of the suction sidewall 106) may be attached. The separately formed portion of the suction sidewall 106 defining the trailing edge section 114 may be formed using an additive manufacturing process, and may include a plurality of pressure drop members 130 extending partially into a trailing edge cooling channel 118 once the trailing edge section 114 is attached to the body section 116 of the airfoil 90. Notably, for the embodiment depicted, the trailing edge cooling channels 118 may be together defined by the suction sidewall 106 and the pressure sidewall 104 (or rather the projection 142 of the pressure sidewall 104). Accordingly, as with the embodiments described above, the separately formed trailing edge section 114 may be fully constructed and then attached to the body section 116. Alternatively, the trailing edge section 114 may be construction (e.g., printed) directly onto the projection 142 of the pressure sidewall 104.

Figure 8:
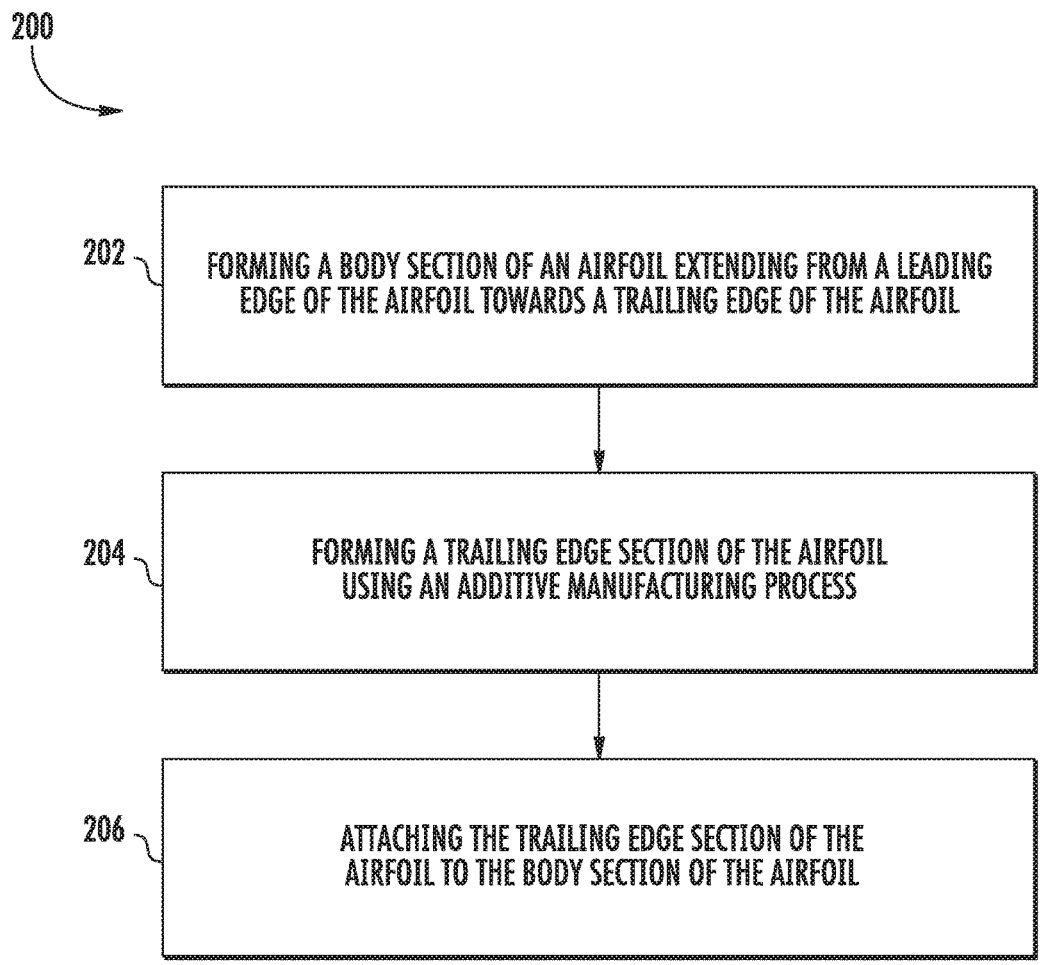
FIG. 8 is a flow diagram of a method for manufacturing a turbine airfoil in accordance with an exemplary aspect of the present disclosure.

Referring now to FIG. 8, a flow diagram of an exemplary method (200) of manufacturing a turbine airfoil for a gas turbine engine is provided. The exemplary method (200) may be utilized to manufacture one or more of the exemplary turbine airfoils described above with reference to FIGS. 2 through 7. Accordingly, in certain exemplary aspects, the exemplary airfoil may define a leading edge, a trailing edge, and a span.

The exemplary method (200) includes at (202) forming a body section of the airfoil extending from the leading edge of the airfoil towards the trailing edge of the airfoil. The body section defines the cooling air cavity located proximate the trailing edge of the airfoil. Additionally, the exemplary method (200) includes at (204) forming a trailing edge section of the airfoil using an additive manufacturing process. The trailing edge section is formed integrally with or attachable to the body section the airfoil and at least partially defines a trailing edge cooling channel. The trailing edge cooling channel extends from the cooling air cavity defined by the body section substantially to the trailing edge of the airfoil. The trailing edge section is additionally formed such that the trailing edge section includes a plurality of pressure drop members extending partially into the trailing edge cooling channel for reducing an amount of cooling air flowing therethrough.

For the exemplary aspect depicted, forming the body section the airfoil at (202) may include forming the body section of the airfoil by casting the body section of the airfoil. With such an exemplary aspect, the trailing edge section may be formed at (204) separately from, but attachable to, the body section of the airfoil. Accordingly, with such an exemplary aspect, the exemplary method (200) further includes at (206) attaching the trailing edge section of the airfoil to the body section of the airfoil. Attaching the trailing edge section to the body section at (206) may include attaching by joining, brazing, diffusion bonding, etc. However, in other exemplary aspects, forming the body section of the airfoil at (202) may include forming the body section of the airfoil using an additive manufacturing process. With such an exemplary aspect, the trailing edge section may be formed at (204) integrally with the body section of the airfoil.

Furthermore, in certain exemplary aspects, the airfoil may include a pressure sidewall and suction sidewall. The pressure sidewall and suction sidewall may together define the body section of the airfoil. As is discussed with the various exemplary embodiments of FIGS. 4 through 7, in certain exemplary aspects, forming the trailing edge section of the airfoil at (204) may include forming the trailing edge section the airfoil to include a portion of the pressure sidewall and a portion of the suction sidewall (see FIG. 4). However, in other exemplary aspects, forming the trailing edge section of the airfoil at (204) may instead include forming the trailing edge section of the airfoil to include only a portion of one of the pressure sidewall or suction sidewall (see FIGS. 6 and 7). In such an exemplary aspect, forming the body section of the airfoil at (202) may include forming an extension extending along the span of the airfoil for receiving the trailing edge section. Such an exemplary aspect may further include attaching the trailing edge section of the airfoil to the body section the airfoil, or more particularly, attaching the trailing edge section of the airfoil to the extension of the body section of the airfoil. Further, with such an exemplary aspect, the trailing edge section may define the trailing edge cooling channel with the extension of the body section of the airfoil.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine airfoil for a gas turbine engine, the turbine airfoil defining a spanwise direction, a leading edge, and a trailing edge, the turbine airfoil comprising:
a pressure sidewall extending along the spanwise direction and from the leading edge towards the trailing edge; and
a suction sidewall also extending along the spanwise direction and from the leading edge towards the trailing edge, the pressure sidewall and the suction sidewall defining a cooling air cavity therebetween, one or both of the pressure sidewall and suction sidewall defining a plurality of trailing edge cooling channels spaced along the spanwise direction;
wherein each of the plurality of trailing edge cooling channels extends from the cooling air cavity substantially to the trailing edge; and
wherein one or both of the pressure sidewall and suction sidewall comprises a plurality of pressure drop members, with at least one pressure drop member extending partially into each of the trailing edge cooling channels for reducing an amount of cooling air flowing therethrough from the cooling air cavity.

2. The turbine airfoil of claim 1, wherein each trailing edge cooling channel defines a plurality of metering sections, and wherein one of the plurality of pressure drop members is located at each of the metering sections.

3. The turbine airfoil of claim 1, wherein each trailing edge cooling channel defines a first cross-sectional flow area immediately upstream of the plurality of pressure drop members, wherein each trailing edge cooling channel defines a second cross-sectional flow area immediately downstream of the plurality of pressure drop members, and wherein the first cross-sectional flow area is substantially the same as the second cross-sectional flow area.

4. The turbine airfoil of claim 1, wherein the pressure sidewall and suction sidewall together define a body section of the airfoil, wherein one or both of the pressure sidewall and suction sidewall defines a trailing edge section of the airfoil, and wherein the trailing edge section is formed separately from the body section and attached to the body section.

5. The turbine airfoil of claim 4, wherein the pressure sidewall and suction sidewall together define the trailing edge section of the airfoil.

6. The turbine airfoil of claim 4, wherein one of the pressure sidewall or the suction sidewall defines the trailing edge section and comprises the plurality of pressure drop members extending partially into each of the trailing edge cooling channels.

7. The turbine airfoil of claim 4, wherein the trailing edge section is formed using an additive manufacturing process.

8. The turbine airfoil of claim 7, wherein the body section of the airfoil is formed at least partially by casting.

9. The turbine airfoil of claim 1, wherein the plurality of pressure drop members are configured as a plurality of rounded protrusions extending partially into each of the trailing edge cooling channels.

10. The turbine airfoil of claim 1, wherein each trailing edge cooling channel is configured as a pressure side bleed slot.

11. A method of manufacturing a gas turbine engine turbine airfoil defining a leading edge and a trailing edge, the method comprising:
forming a body section of the airfoil extending from the leading edge of the airfoil towards the trailing edge of the airfoil, the body section defining a cooling air cavity located proximate the trailing edge; and
forming a trailing edge section of the airfoil using an additive manufacturing process, the trailing edge section being formed integrally with or attachable to the body section of the airfoil, the trailing edge section at least partially defining a plurality of trailing edge cooling channels spaced along a spanwise direction, each extending from the cooling air cavity defined by the body section substantially to the trailing edge of the airfoil, the trailing edge section comprising a plurality of pressure drop members extending partially into the trailing edge cooling channels for reducing an amount of cooling air flowing therethrough.

12. The method of claim 11, wherein forming the body section of the airfoil comprises forming the body section the airfoil by casting the body section of the airfoil.

13. The method of claim 12, further comprising:
attaching the trailing edge section of the airfoil to the body section of the airfoil.

14. The method of claim 13, wherein forming the body section of the airfoil comprises forming an extension extending along the spanwise direction of the airfoil for receiving the trailing edge section, wherein attaching the trailing edge section of the airfoil to the body section of the airfoil comprises attaching the trailing edge section of the airfoil to the extension of the body section of the airfoil, and wherein the trailing edge section defines the plurality of trailing edge cooling channels with the extension of the body section.

15. The method of claim 11, wherein forming the body section the airfoil comprises forming the body section of the airfoil using an additive manufacturing process.

16. The method of claim 11, wherein the turbine airfoil is a rotor blade from a stage of turbine rotor blades.

17. The method of claim 11, wherein each trailing edge cooling channel defines a metering section, and wherein one of the plurality of pressure drop members is located at the metering section.

18. The turbine airfoil of claim 1, wherein each trailing edge cooling channel includes in serial flow relationship an inlet, an interior portion, and a trailing edge cooling slot.

19. The turbine airfoil of claim 1, wherein the plurality of pressure drop members in each trailing edge cooling channel are arranged linearly within the channel.

* * * * *